INVENTOR.
CURTIS HILLYER
BY
Campbell, Brumbaugh, Free & Graves
HIS ATTORNEYS.

METHOD OF AND APPARATUS FOR COMPARING INFORMATION

Filed March 25, 1952 4 Sheets-Sheet 2

INVENTOR.
CURTIS HILLYER
BY
Campbell, Brumbaugh, Free & Graves
HIS ATTORNEYS.

INVENTOR.
CURTIS HILLYER
BY
Campbell, Brumbaugh, Free & Graves
HIS ATTORNEYS.

May 25, 1954 C. HILLYER 2,679,636

METHOD OF AND APPARATUS FOR COMPARING INFORMATION

Filed March 25, 1952 4 Sheets-Sheet 4

INVENTOR.
CURTIS HILLYER
BY
Campbell, Brumbaugh, Free & Graves
HIS ATTORNEYS.

Patented May 25, 1954

2,679,636

UNITED STATES PATENT OFFICE 2,679,636

METHOD OF AND APPARATUS FOR COMPARING INFORMATION

Curtis Hillyer, Short Hills, N. J.

Application March 25, 1952, Serial No. 278,517

9 Claims. (Cl. 340—149)

The present invention relates broadly to the comparison of information by operating upon waves that embody such information.

More specifically, the invention contemplates determining the degrees of similarity between parts of a large mass of arbitrarily complicated information and a particular piece of information which may be a part of another mass of complex information. The large mass of information may be derived from an independent data source and compared with a particular piece of information from a reference data source under local control. On the other hand, the independent data source may supply a particular piece of information which is matched with parts of a large mass of recorded reference information.

The degrees of similarity between the particular piece of information and the parts of the mass of information may be indicated as a function of the locations of the parts in the mass. Alternatively, an indication may be produced whenever a match of predetermined quality is encountered. In still another form of the invention, all parts of the mass of information are investigated and then the location of the part that most closely approximates the particular piece of information is identified.

In order to identify unambiguously a very small part in a mass of information, the present invention makes use of some of the original context, that is, the environment of the part, on the theory that a very small part is only unique in its relationship to other contiguous or closely associated parts. For example, a reference point on a monochrome photograph cannot be unambiguously located on a second monochrome photograph without taking into account the character of the points closely adjacent the reference point, since the reference point is characterized only by a particular tone, and there will usually be many points having substantially identical tones.

The amount of context which must be considered depends upon the character of the information. Correct identification of a particular very small part in a mass of regular or monotonous information requires a substantial amount of context. Thus, a specific point in a repetitive pattern cannot be located without examining a rather extensive area surrounding the point.

In accordance with the present invention, the mass of information, wherein the particular piece of information is to be located, is represented by a first series of waves which are not necessarily periodically related. The waves have generally dissimilar shapes, since each wave represents a different portion of the mass of information. The particular piece of information which is to be located and a number of adjacent bits of information sufficient to provide context are represented as a second series of waves of substantially constant shape. The first and second series of waves are generated in synchronism. If the independent data source is not subject to local timing control, the independent data waves must serve as a timing standard. Each independent data wave is opposed to its associated reference data wave, for the purpose of deriving a third series of waves representing the instantaneous amplitude differences between the opposed waves.

The effective amplitude of each wave representing the instantaneous amplitude differences between each pair of simultaneously generated reference and independent data waves is indicative of the degree of match between such waves. In other words, the area defined by the instantaneous amplitude differences during each one of the third series of waves is a measure of the match between those portions of the reference and independent data being investigated. It is to be understood that positive areas in the wave are to be added to rather than subtracted from negative areas unlike an averaging process. The effective amplitude may be measured by some type of integrating operation.

Each signal indicative of the degree of match may be displayed as a function of the number of the attempt to obtain a match or as a function of the time position of such attempt. Alternatively, the signals indicative of the degree of match may be operated upon to detect a predetermined quality of match or to select the optimum match from among a series of attempted matches.

In order that the invention may be more fully understood, it will now be described in detail with reference to the accompanying drawings wherein.

Similar reference numerals are used in the drawings to indicate corresponding parts.

Figure 1:
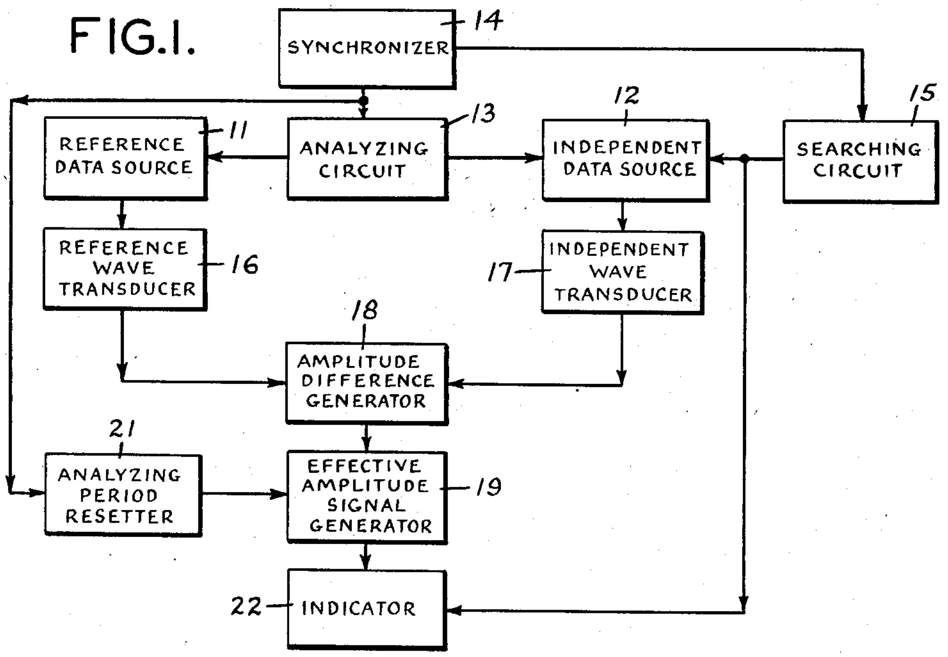
Figure 1 is a block diagram illustrating a form of the invention indicating the existence of a match of predetermined quality with reference to the position of the match or the degree of each match with reference to the position of such match.

Referring now to Figure 1, a reference data source 11 contains information which at least approximately corresponds to some information mixed with a much larger mass of information contained in an independent data source 12. The substantially constant reference information is converted into a first series of recurrent reference waves by means of an analyzing circuit 13 timed by a synchronizer 14. The analyzing circuit 13 also converts a selected portion of the data in the source 12 into a second series of independent waves. The portion of independent data that is thus converted is selected by a searching circuit 15 which is also timed by the synchronizer 14. The action of the searching circuit 15 is much slower than the analyzing circuit 13 and serves to change gradually or in discrete amounts the time or space position of the portion of the data in the source 12 that is being analyzed.

Thus the waves supplied from the reference data source 11 to a transducer 16 are substantially constant or at most slowly varying while the waves supplied from the independent data source 12 to a transducer 17 are in general different from each other. The reference waves and independent waves are applied to an amplitude difference generator 18 which serves to produce a third series of waves having instantaneous amplitudes corresponding to the differences between the amplitudes of the applied waves.

The difference waves are supplied to an effective amplitude signal generator 19 which integrates the positive and/or negative portions of the waves without regard to polarity to obtain successive integral signals having amplitudes indicative of the degree of match between the reference and independent waves. At the end of each analyzing period, a resetter 21 restores the generator 19 to a reference condition, and the integral signal is supplied to an indicator 22. The indicator 22 is also under the control of the searching circuit 15 and is adapted to display the degree of match with reference to the time or space position of the portion of the data in the independent source 12 that is being analyzed or the existence of a match of predetermined quality with reference to the position of the match.

The data that is compared may be derived from any one of various possible sources. For example, the independent source 12 may comprise a landscape or seascape which is analyzed by means of the analyzing circuit 13 in the form of a pulsed radar system. Under these circumstances, the search circuit 15 may comprise means for varying the direction of the radar beam to alter the portion of the terrain being analyzed. The reference data source 11 may be a storage tube.

The transducers 16 and 17 generally include amplifiers having substantially similar characteristics. The upper and lower limits of the necessary frequency response are determined in part by the fineness and coarseness, respectively, of the detail in the information. Increased accuracy of match or speed of match both raise the required upper limit of frequency response.

The indicator 22 may comprise a cathode ray tube providing a two-dimensional display of degree of match versus time or position of match. Alternatively, it may include a gated mixer tube which passes a signal having an amplitude proportional to the time or position of match only in response to a signal from the effective amplitude signal generator 19 having an amplitude indicative of a predetermined quality of match, for example, a substantially perfect match. Known types of counting circuits may likewise be employed in the indicator 22.

Figure 2:
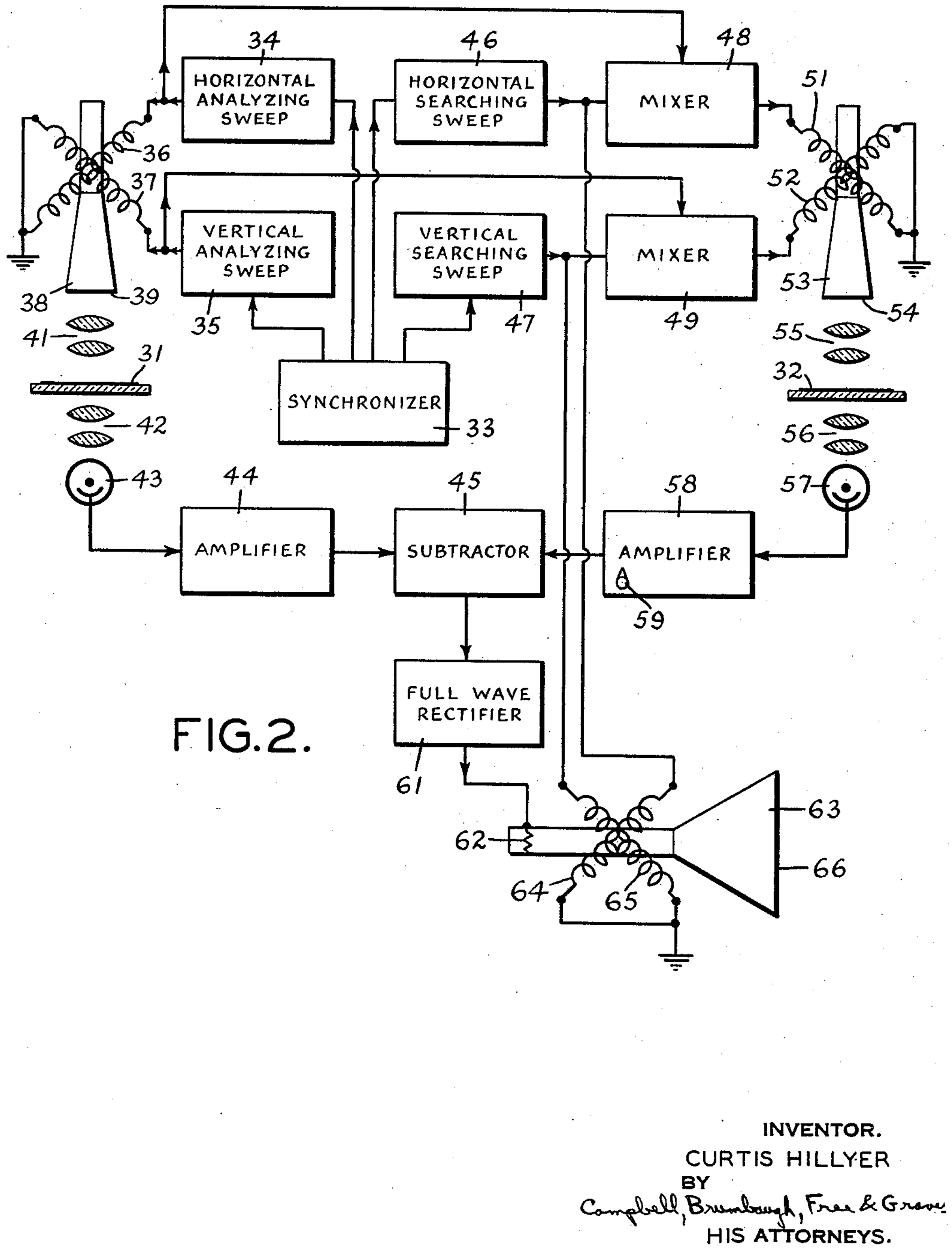
Figure 2 is a block diagram of a particular embodiment of the form of the invention illustrated in Figure 1.

Referring now to Figure 2, there is illustrated a particular form of the system discussed with reference to Figure 1. The apparatus of Figure 2 serves to locate data contained on a sheet 31 among a much larger mass of data contained on a sheet 32. It is immaterial which sheet represents reference data. The data is represented as variations in tone over a surface and may take such forms as a drawing, a printed or written page, or a photographic reproduction. Sheets 31 and 32 are shown, for example, to be positive or negative photographic transparencies.

A synchronizer 33 supplies synchronizing pulses to a horizontal analyzing sweep circuit 34 and a vertical analyzing sweep circuit 35. The output circuits of the horizontal and vertical analyzing sweep circuits 34 and 35 are connected to corresponding cathode ray deflection circuits 36 and 37, respectively. The deflection circuits 36 and 37 are associated with a cathode ray tube 38 and cause a luminous spot to sweep over the face 39 of the tube in a regular manner so as to cover a predetermined area, such as a square, for example. A lens system 41 in front of the face 39 of the tube 38 focuses the luminous spot upon the surface of the sheet 31. Beneath the sheet 31 is a second lens system 42 which collimates the light transmitted from the area covered by the flying spot on the sheet 31 and directs a beam of light onto a photosensitive tube 43. The photosensitive tube 43 is adapted to generate a voltage proportional to the instantaneous intensity of the received light beam. The voltage thus generated varies in accordance with photographic densities encountered by the luminous spot as it is swept over the sheet 31 and corresponds to the reference data. A voltage amplifier 44 amplifies the signal generated by the photosensitive tube 43 and applies the same to a voltage subtractor circuit 45.

The synchronizer 33 likewise supplies triggering pulses to horizontal and vertical searching sweep circuits 46 and 47. The output circuits of the sweep circuits 46 and 47 are connected to voltage mixers 48 and 49, respectively, wherein the searching sweep voltages are combined with the analyzing sweep voltages from the sweep circuits 34 and 35, respectively. The output circuits of the horizontal and vertical mixers 48 and 49 are connected to a pair of deflection circuits 51 and 52 in a cathode ray tube 53. A luminous spot on the face 54 of the tube 53 is focused by a lens system 55 upon the surface of the sheet 32. The action of the spot on the sheet 32 is to sweep out an area corresponding in shape to the area swept out by means of the cathode ray tube 38 on the sheet 31. At the same time, however, the searching sweep acts to move the analyzing area in a regular manner over the surface of the sheet 32 so as to describe a searching area which may be relatively large in comparison to the analyzing area.

Beneath the sheet 32 a further lens system 56 gathers the light transmitted through the sheet 32 and directs it upon a photosensitive tube 57. The photosensitive tube 57 generates a voltage dependent upon the photographic densities encountered by the luminous spot as it travels over the surface of the sheet 32. The voltage generated by the photosensitive tube 57 corresponds to the independent data, and after amplification in an amplifier 58 having a gain control 59, is applied to the subtractor circuit 45.

The subtractor circuit 45 mutually opposes the instantaneous amplitudes of the two signals supplied from the amplifiers 44 and 58 and applies the resultant signal to a full-wave rectifier 61. The rectifier 61 converts the signal from the subtractor circuit 45 into a direct voltage having an amplitude coresponding to the absolute instantaneous amplitude difference between the signals coming from the amplifiers 44 and 58. This fluctuating direct voltage is applied to the control grid 62 of a cathode ray tube 63 having horizontal and vertical deflection coils 64 and 65 connected to the horizontal and vertical searching sweep circuits 46 and 47, respectively.

Inasmuch as the intensity of the cathode ray beam is under the control of a unidirectional voltage representing the instantaneous amplitude differences, the relatively long persistent fluorescent material on the face 66 of the tube 63 tends to generate a luminous spot which has a light intensity indicative of the degree of match between the reference data and the independent data. The deflection coils 64 and 65 simultaneously position the luminous spot with reference to the location of the analyzing area on the data sheet 32. Accordingly, the face 66 of the cathode ray tube 63 displays in two dimensions the degree of match between the lesser data and each portion of the greater data. The best or the worst match can be readily determined.

If the lesser data is changing slowly relative to the searching period, it is evident that the optimum match may be monitored, and, if desired, the position of the sheet 32 may be moved to maintain a substantially constant apparent location of the lesser data.

There is of course a wide variety of information which may be represented on sheets 31 and 32. These sheets may, for example, comprise stereoscopic pairs of photographs. If these photographs have been rectified, that is, corrected for tilt and tip by rephotographing the original photographs at appropriate angles, the cathode ray tube 66 will indicate a substantial match at a location corresponding to the stereoscopic displacement of the picture element being analyzed. The sheets 31 and 32 may be synchronously manually or mechanically moved to analyze contiguous picture elements. The tube 66 will then indicate a series of stereoscopic displacements which, when suitably corrected, are measures of the elevations of the corresponding portions of the photographed terrain.

The analyzing and searching circuits may take many forms and the use of horizontal and vertical sweeps in cathode ray scanning tubes is illustrative only. Specifically, image scanning tubes may be used in place of the photosensitive tubes 43 and 57 with an extended source of illumination replacing the cathode ray tubes 38 and 53. Different optical ratios would of course be required, and the deflection coils 36, 37 and 51, 52 would be modified for use with the image scanning tubes.

It is preferable to provide amplitude controls as well as position controls for all the sweep circuits in order to adjust the size or shape of the analyzing or searching patterns to suit the detail on the sheets 31 and 32. For example, pictures having very fine detail require a smaller analyzing pattern to respond to the fine variations and to avoid ambiguities caused by repetitive detail as compared to pictures having coarse detail which can be scanned more rapidly and with a larger analyzing pattern. The searching pattern should be large enough to more than cover areas which may have no detail in order to maintain a continuous basis for comparison. However, a very large pattern will include a needlessly wide variety of non-related data and tax the capacity of the apparatus.

Figure 3:
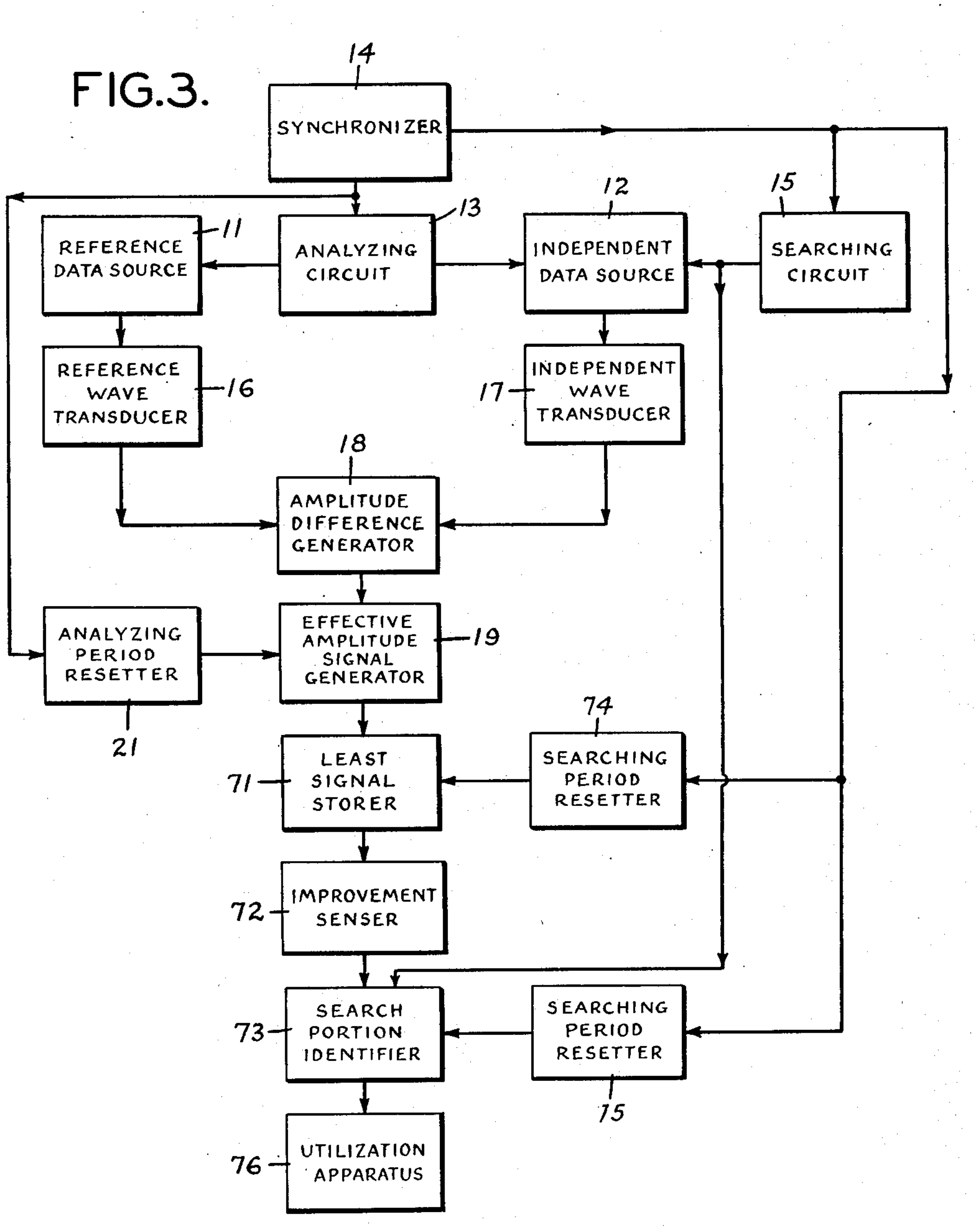
Figure 3 is a block diagram illustrating a form of the invention indicating the position of optimum match.

The first portion of the structure of Figure 3 is similar to the system shown in Figure 1 and similar reference numerals indicate corresponding parts. The indicator 22 is, however, replaced by a group of circuits which identify the position of best match after the conclusion of a predetermined number of attempts to obtain a match.

At the end of each analyzing period when the resetter 21 restores the generator 19 to a reference condition, the effective amplitude signal is transferred to a least amplitude storer 71. The storer 71 is receptive to the effective amplitude signal applied to it only if the amplitude of the signal is indicative of a better match than the match indicated by a prior stored signal.

Whenever the storer 71 accepts a signal, a pulse is generated by a match improvement senser 72 and applied to a search portion identifier 73. The pulse causes the identifier 73 to generate and store an identification signal corresponding to the signal momentarily being produced by the searching circuit 15. At the end of the search period, the resetters 74 and 75 return the least amplitude storer 71 and the search portion identifier 73, respectively, to their reference conditions. At this time, the final identification signal stored by identifier 73 is applied to utilization apparatus 76 which may comprise an indicator or servomechanism.

Figure 4:
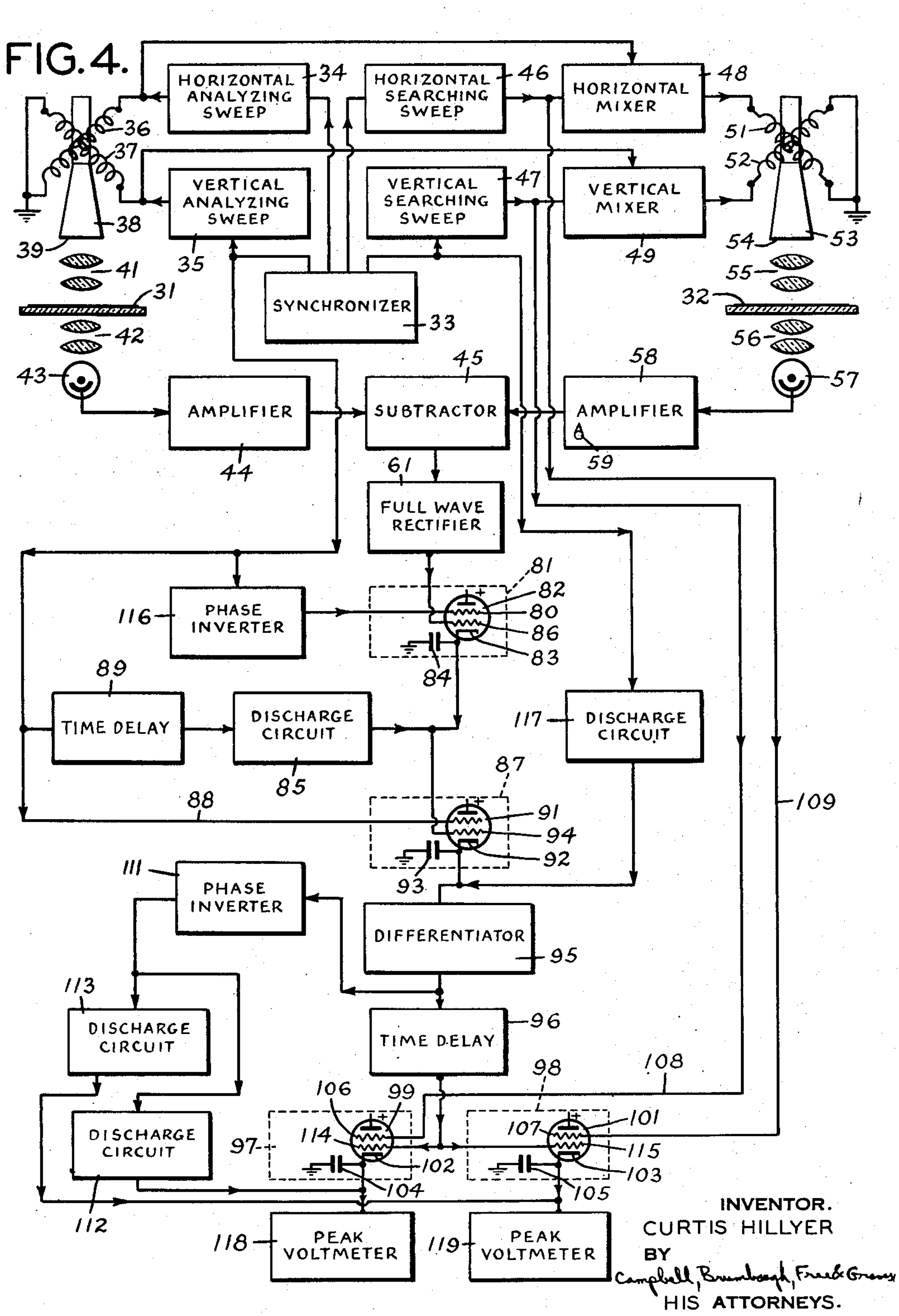
Figure 4 is a block diagram of a particular embodiment of the form of the invention illustrated in Figure 3.

Referring now to Figure 4 there is shown a system, the first portion of which is similar to the structure of Figure 2. The cathode ray tube 66 of Figure 2 is, however, removed and replaced by circuits which indicate the relative coordinates of the optimum match encountered during a search period.

The absolute amplitude difference signals produced by the full wave rectifier 61 in Figure 4 are applied to an integrator 81. The integrator 81 is shown as a multi-grid electron tube 82 having a cathode 83 normally isolated from ground by a capacitor 84. The charge on the capacitor 84 is placed at a convenient reference value, for example, zero, at the commencement of each analyzing period by a discharge circuit 85 under the control of the synchronizer 33. The signals from rectifier 61 are applied with negative polarity to the control grid 86 of the tube 82. The normal conduction current through the tube 82 acts to charge the capacitor 84 to a maximum value in the absence of any appreciable applied signal during the analyzing period. In the presence of any signal from the rectifier 61, the current flowing into the capacitor 84 is reduced. The charge and, consequently, the voltage across the capacitor 84 has an increasing value with a decreasing effective amplitude difference between waves issuing from the amplifiers 44 and 58.

Accordingly, the amplitude of the voltage generated by the integrator 81 and appearing across capacitor 84 is indicative of the degree of match between the data being analyzed on the sheet 31 and the data comprising a portion of the sheet 32.

The output voltage from the integrator 81 representing the degree of match is applied to a gate circuit 87. In order that the gate circuit 87 respond only to the final amplitude of the signal derived from the integrator 81, a control pulse is applied from the synchronizer 33 over a lead 88. This control pulse renders the gate circuit 87 sensitive to the output of the integrator 81. A time delay circuit 89 is interposed between the discharge circuit 85 and the synchronizer 33 in order that the full voltage across the capacitor 84 in the integrator 81 be applied to the gate circuit 87 before the capacitor 84 is discharged and placed in condition for determining the area defined by the instantaneous amplitude differences during the next analyzing period. The gate circuit 87 comprises a multi-grid electron tube 91 having its cathode 92 isolated from ground by a capacitor 93. This capacitor biases the tube in accordance with the stored charge. Accordingly, no additional charge is stored unless the voltage applied to the control grid 94 of the tube 91 is greater than that already on the capacitor 93.

A differentiator 95 is connected to the capacitor 93 in the gate circuit 87 and is responsive to any increase in the stored voltage. In other words, it produces a pulse in response to any improvement in the match.

The pulses generated by the differentiator 95 and signifying the "best match so far" are applied through a time delay circuit 96 to a pair of similar gated mixer circuits 97 and 98. Circuits 97 and 98 comprise multi-grid electron tubes 99 and 101, respectively, having cathodes 102 and 103, respectively, isolated from ground by capacitors 104 and 105, respectively. The second control grids 106 and 107 in the tubes 99 and 101 are supplied voltages over leads 108 and 109, respectively, connected to horizontal and vertical searching sweep circuits 46 and 47, respectively, and representing the horizontal and vertical locations of the analyzing sweep on the sheet 32.

Whenever a gating pulse is received from the differentiator 95, voltages are transferred to the cathode storage capacitors 104 and 105 which are proportional to the vertical and horizontal positions of the portion of the sheet 32 that has just been analyzed. The storage capacitors 104 and 105 are discharged before the application of each pulse from the differentiator 95 by the delaying action of the time delay circuit 96 which permits a pulse from the differentiator 95 to be inverted by a phase inverter 111 and applied through discharge circuits 112 and 113 to return the charges on the capacitors 104 and 105, respectively, to reference values before the new gating pulse reaches the control grids 114 and 115 of the mixer tubes 99 and 101, respectively. The last pulse which is stored during a search period represents the position of the best match found during that period.

A phase inverter 116 is supplied pulses from the synchronizer 33 at the end of each analyzing period and applies the same in the form of negative blanking pulses to a second grid 80 of the tube 82 in the integrator circuit 81. This arrangement prevents the integrator 81 from operating on spurious signals which may occur during the return of the vertical analyzing sweep between the end of one analyzing period and the beginning of the next.

A discharge circuit 117 is coupled to the storage capacitor 93 in the output of the gate circuit 87 to discharge the same at the end of each search period in order that the entire process of selecting the best match may be commenced afresh.

Peak voltmeters 118 and 119 are connected to the capacitors 104 and 105, respectively, in the output circuits of the gated mixers 97 and 98, respectively, and respond to the maximum or last voltages that are stored. The voltmeters 118 and 119 may be calibrated in terms of the relative vertical and horizontal positions of the portion of the sheet 32 that best matches the analyzed portion of the sheet 31.

Figure 5:
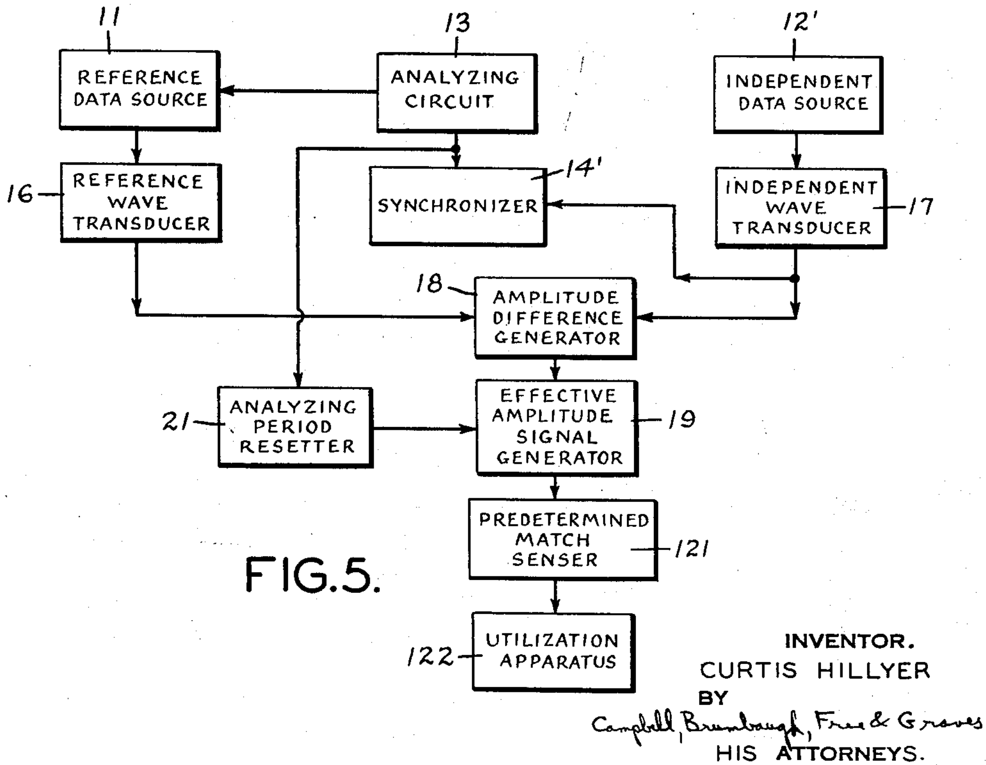
Figure 5 is a block diagram illustrating a form of the invention indicating the occurrence of a match of predetermined quality.

Referring now to Figure 5, a particular piece of information or reference data, which is recorded in the reference data source 11, may be detected among a mass of information derived from an independent data source 12′ in the form of a sequence of independent waves. The independent data source 12′ may, for example, comprise a train of sound or light waves whereas the reference data may be recorded on a magnetic tape or an image storage tube. The reference data is recurrently converted into a reference wave in synchronism with significant portions of the waves from the indepedent data source 12′. This is accomplished by means of the analyzing circuit 13 acting under the control of a synchronizer 14′ which is in turn timed by characteristic portions, for example, by the abruptly rising intensity, of the electrical waves generated by the independent wave transducer 17, which waves correspond to the waves from the independent data source 12′. The reference wave transducer 16 converts the data analyzed by the analyzing circuit 13 into electrical reference waves each of which is applied to the amplitude difference generator 18 in opposition to the associated independent wave from the transducer 17.

The amplitude difference generator 18 is connected to the effective amplitude signal generator 19 which generates successive signals having amplitudes indicative of the degree of match between the reference and independent waves. The analyzing resetter 21 restores the generator 19 to its reference condition at the end of each analyzing period.

A predetermined match senser 121 is connected to the output of the effective amplitude signal generator 19 and is adapted to generate a signal whenever the amplitude of the applied effective amplitude signal indicates that the match between the reference and independent waves has reached some desired value. When this occurs the senser 121 supplies a signal to a utilization apparatus 122. The utilization apparatus 122 may, for example, comprise an alarm or control circuit or may otherwise indicate the occurrence of the anticipated condition.

A suitable application of the arrangement of Figure 5 would be where only knowledge of the existence of the reference data among the independent data is desired or where the reference data is capable of being located in time but not in space.

The present invention is capable of comparing any information which can be expressed in terms of waves. For example, if a single frame of motion picture film is employed as the source of independent data, a vast number of reference frames may be searched until a substantial matching of wave shapes indicates that the corresponding reference picture frame has been found. The searching cycle may thereupon be terminated.

It is not necessary that the reference information be substantially constant, although this is true in the usual case. An exception occurs when both reference and independent data are changing and it is desired to detect a fortuitous match of predetermined quality.

In view of the many forms that the invention may assume, the illustrated embodiments are not to be regarded as limiting the appended claims.

I claim:

1. Apparatus for determining the degree of match between a first series of waves of generally varying shape and a second series of waves of generally constant shape comprising means for subtracting the instantaneous amplitudes of each wave of one of said first and second series from the instantaneous amplitudes of each concurrent wave of the other of said first and second series to obtain a third series of waves, and means for integrating the instantaneous amplitudes throughout each of said third series of waves to determine the degree of match.

2. Apparatus for determining the best match between a first series of waves of substantially constant shape and a second series of waves of generally varying shape comprising means for subtracting the waves of the first and second series from each other to obtain a unidirectional third series of waves, means for integrating the waves of the third series to obtain an integral signal indicative of the degree of match between the first and second series of waves, means for storing the integral signal whenever the degree of match is improved, means responsive to improvement in the match for storing an identification signal that identifies which wave of the second series was being matched, and means for transmitting the final stored identification signal after the end of the second series of waves to effect said determination.

3. Apparatus for determining which wave of a series of waves has the greatest amplitude comprising means for generating a timing signal for identifying each wave of said series, means for storing a signal having an amplitude dependent upon the amplitude of a wave whenever said wave is greater than any prior wave, means responsive to increase in the stored signal for storing an identification signal having an amplitude dependent upon the amplitude of the timing signal, and means for supplying the final stored identifiaction signal after the termination of said series of waves to effect said determination.

4. Apparatus for indicating the degrees of match between a particular piece of recorded information and a mass of recorded information comprising means for analyzing a selected portion of the mass of information to generate a first series of waves, means for simultaneously analyzing the particular piece of information to generate a second series of waves, means for altering the selection of the portion of information to investigate said mass of information, means for opposing each wave of said first series with the simultaneously generated wave of said second series and for rectifying the resultant wave to obtain a series of unidirectional waves representative of instantaneous amplitude differences, and means for integrating the instantaneous amplitudes throughout each unidirectional wave to produce signals having amplitudes indicative of the degrees of match between simultaneous waves of said first and second series.

5. Apparatus for indicating a predetermined degree of match between a particular piece of recorded information and a mass of recorded information comprising means for analyzing a selected portion of the mass of information to generate a first series of waves, means for simultaneously analyzing the particular piece of information to generate a second series of waves, means for altering the selection of the portion of information to investigate said mass of information, means for opposing each wave of said first series with the simultaneously generated wave of said second series and for rectifying the resultant wave to obtain a series of unidirectional waves representative of instantaneous amplitude differences, means for integrating the instantaneous amplitudes throughout each unidirectional wave to produce signals having amplitudes indicative of the degrees of match between simultaneous waves of said first and second series and means for generating a further signal identifying the variable portion of the mass of information that was being analyzed when the degree of match reached a predetermined value.

6. Apparatus for indicating the degrees of match between a particular piece of recorded information and a mass of recorded information comprising means for analyzing a selected portion of the mass of information to generate a first series of waves, means for simultaneously analyzing the particular piece of information to generate a second series of waves, means for altering the selection of the portion of information to investigate said mass of information, means for opposing each wave of said first series with the simultaneously generated wave of said second series and for rectifying the resultant wave to obtain a series of unidirectional waves representative of instantaneous amplitude differences, means for integrating the instantaneous amplitudes throughout each unidirectional wave to produce signals having amplitudes indicative of the degrees of match between simultaneous waves of said first and second series and means for indicating said signals with reference to the location of the portion of the mass of information that is being analyzed.

7. Apparatus for indicating the optimum degree of match between a particular piece of recorded information and a mass of recorded information comprising means for analyzing a selected portion of the mass of information to generate a first series of waves, means for simultaneously analyzing the particular piece of information to generate a second series of waves, means for altering the selection of the portion of information to investigate said mass of information, means for opposing each wave of said first series with the simultaneously generated wave of said second series and for rectifying the resultant wave to obtain a series of unidirectional waves representative of instantaneous amplitude differences, means for integrating the instantaneous amplitudes throughout each unidirectional wave to produce signals having amplitudes indicative of the degrees of match between simultaneous waves of said first and second series and means for generating a further signal after the mass of information has been investigated identifying the variable portion of the mass of information that was being analyzed when the degree of match reached an optimum value.

8. Apparatus for determining the degrees of match between a first series of waves of generally varying shape and a second series of waves of generally constant shape comprising means for opposing each wave of said first series and a simultaneously generated wave of said second series to obtain a third series of waves representative of instantaneous amplitude differences, and means for integrating the instantaneous amplitudes throughout each wave of said third series to produce signals having amplitudes indicative of the degrees of match between simultaneous waves of said first and second series.

9. Apparatus for determining a predetermined degree of match between a first series of waves of generally varying shape and a second series of waves of generally constant shape comprising means for opposing each wave of said first series and a simultaneously generated wave of said second series, means for rectifying the resultant waves to obtain a series of unidirectional waves representative of instantaneous amplitude differences, means for integrating the instantaneous amplitudes throughout each unidirectional wave to produce signals having amplitudes indicative of the degrees of match between simultaneous waves of said first and second series, and means for generating a signal whenever the degree of match exceeds a predetermined value.

References Cited in the file of this patent

UNITED STATES PATENTS

| Number | Name | Date |
|---|---|---|
| 2,283,226 | Porter | May 19, 1942 |
| 2,447,336 | Hisserich | Aug. 17, 1948 |
| 2,493,543 | Merchant | Jan. 3, 1950 |
| 2,530,828 | Leverenz | Nov. 21, 1950 |
| 2,533,242 | Gridley | Dec. 12, 1950 |
| 2,594,358 | Shaw | Apr. 29, 1952 |